N. S. Dodge,
Horse Power,
No 27,278, Patented Feb. 28, 1860.

Witnesses:
R. Y. Ger
G. H. Harrington

Inventor:
Nathan S. Dodge,

UNITED STATES PATENT OFFICE.

NATHAN S. DODGE, OF INDIANAPOLIS, INDIANA.

HORSE-POWER.

Specification of Letters Patent No. 27,278, dated February 28, 1860.

*To all whom it may concern:*

Be it known that I, NATHAN S. DODGE, of the city of Indianapolis, in the county of Marion and State of Indiana, have made a new and useful Improvement in Horse-Power; and I do hereby declare that the following is a full, clear, and exact description of the construction and arrangement thereof, reference being had to the annexed drawings, making a part of this specification, in which—

Figure 2:
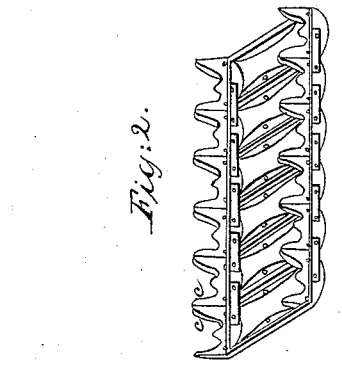
Figure 1:
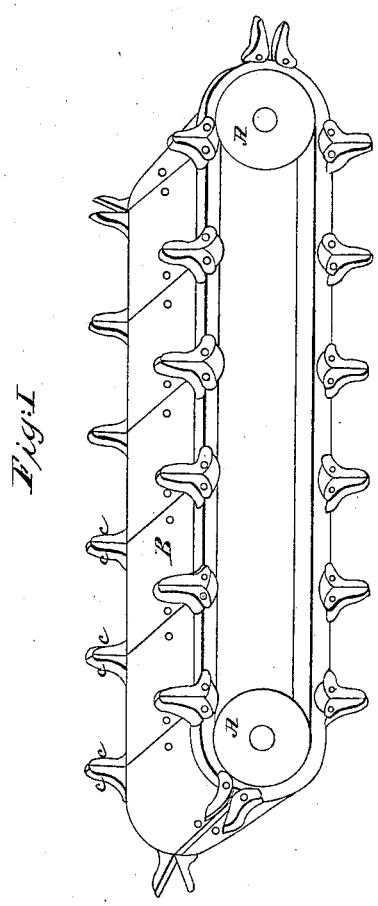

Figure 1 is a perspective view of the construction and arrangement thereof. Fig. 2—is a section of so much of the machine as is necessary to exhibit the form and shape of the iron pieces which support the endless tread (B)—and, of themselves, constitute an endless self-supporting chain.

The dental projections (c, c,) are so paired and arranged in juxtaposition, as to brace and support each other;—and, enough of them linked together constitute the "endless chain" alluded to, and, hence a basis for the wooden flexible "tread"—or platform—seen at (B.)

A, A, are rollers—of any desirable diameter—fixed in a frame at each extremity of the endless chain, and around which the chain passes;—these rollers thus sustaining the weight of the animal which may walk upon the chain and act as the motor.

The braces (c, c,) being hinged together, and of right-angular shape, it will be seen that when they are passing around the rollers A, A, the top projections part from each other and do not press again until they have passed entirely under the machine, and commence their return on the top again, when—the weight of the animal on the machine—causes them to come together, and their support of each other gives to the top of the endless chain the character of a rigid and inflexible stringer,—thus most admirably obviating any bagging down of the chain, under the propelling weight.

I am aware that machines quite similar to mine have preceded me,—as, for instance—those of "Woodhull"—"Todd,"—and "Kelly." But,—since Woodhull's is twice as complicated as mine:—and the others mechanically defective in strength, and durability, and—none of them accomplish the end in the same manner that I do, nor by the same parts, or integrally—as a machine,—I wholly disclaim their peculiar parts, as well as combinations.

The nature of my machine is at once simple, practical, cheap, and—durable. It is perhaps as near anti-friction in the performance of its functions, as it is possible to make a machine requiring so much strength.

The joints that hold the lugs (c, c,) together, are plain and strong and no supporting rollers are required, save the two rollers—A, A, and, when the upright dental projections come together, so as to make the upper floor of the chain—or walking table—taut and rigid, it is without any additional friction whatever.

And moreover—it will be seen, that the cross cleats B,—upon which the animal walks,—rest on a plane, even with the line of rivets which hold the flexible joints together,—thus securing strength by taking much of the strain off of said rivets, when the animal is walking upon the endless chain.

Therefore what I claim as my invention, and desire to secure by Letters Patent is—

The combination and arrangement of the peculiar shaped—right-angle-braces (c, c,) with the walking cleats, B, and the tension rollers, A, A, substantially as herein set forth, and, for the purposes declared.

NATHAN S. DODGE.

Witnesses:
G. H. HARRINGTON,
D. W. GRUBBS.